United States Patent
Kudose et al.

(10) Patent No.: US 10,158,262 B2
(45) Date of Patent: Dec. 18, 2018

(54) STATOR FOR ELECTRIC ROTATING MACHINE

(71) Applicant: DENSO CORPORATION, Kariya, Aichi-pref. (JP)

(72) Inventors: Yuichi Kudose, Chiryu (JP); Atsushi Umeda, Okazaki (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/638,231

(22) Filed: Mar. 4, 2015

(65) Prior Publication Data
US 2015/0256037 A1 Sep. 10, 2015

(30) Foreign Application Priority Data

Mar. 6, 2014 (JP) .................................. 2014-043452

(51) Int. Cl.
*H02K 1/20* (2006.01)
*H02K 3/30* (2006.01)
*H02K 1/16* (2006.01)
*H02K 3/32* (2006.01)
*H02K 15/12* (2006.01)
*H02K 3/12* (2006.01)

(52) U.S. Cl.
CPC ................. *H02K 1/20* (2013.01); *H02K 1/16* (2013.01); *H02K 3/30* (2013.01); *H02K 3/32* (2013.01); *H02K 15/12* (2013.01); *H02K 3/12* (2013.01); *H02K 2201/09* (2013.01)

(58) Field of Classification Search
CPC ............ H02K 15/12; H02K 1/18; H02K 1/02; H02K 2201/09; H02K 3/30; H02K 3/32; H02K 3/12; H02K 1/16; H02K 1/20

USPC ............. 310/45, 216.009, 216.052, 216.016, 310/216.044, 216.048, 216.049; 29/596
See application file for complete search history.

(56) References Cited

U.S. PATENT DOCUMENTS 2,561,982 A * 7/1951 Hanna ................... H02K 15/12
118/620
2011/0302769 A1* 12/2011 Saito .................... H02K 15/024
29/596

FOREIGN PATENT DOCUMENTS

JP 2010-288424 12/2010
JP 2011-097790 5/2011
(Continued)

OTHER PUBLICATIONS

JP 2013005553 A—machine translation, Description.*
JP 2013059262 A—machine translation, Description.*
JP 2012039720 A—machine translation, Description.*

*Primary Examiner* — Alex W Mok
(74) *Attorney, Agent, or Firm* — Nixon & Vanderhye PC (57) ABSTRACT

A stator for an electric rotating machine includes an annular stator core, an outer cylinder fitted on a radially outer surface of the stator core, and a stator coil mounted on the stator core. The stator core is comprised of a plurality of stator core segments that are arranged in a circumferential direction of the stator core so as to adjoin one another in the circumferential direction. The stator coil is fixed to the stator core by a thermosetting resin that is set by induction-heating the stator core. Each of the stator core segments is formed by laminating a plurality of steel sheets in an axial direction of the stator core and fixing at least some of the steel sheets by staking. The number of staking portions formed in one of the steel sheets is different from the number of staking portions formed in another one of the steel sheets.

11 Claims, 8 Drawing Sheets

(56) References Cited

FOREIGN PATENT DOCUMENTS

| | | | |
|---|---|---|---|
| JP | 2011-120392 | | 6/2011 |
| JP | 2011-125141 | | 6/2011 |
| JP | 2012039720 A | * | 2/2012 |
| JP | 2012-253978 | | 12/2012 |
| JP | 2013005553 A | * | 1/2013 |
| JP | 2013059262 A | * | 3/2013 |

* cited by examiner

STATOR FOR ELECTRIC ROTATING MACHINE

CROSS-REFERENCE TO RELATED APPLICATION

This application is based on and claims priority from Japanese Patent Application No. 2014-43452, filed on Mar. 6, 2014, the content of which is hereby incorporated by reference in its entirety into this application.

BACKGROUND

1 Technical Field

The present invention relates to stators for electric rotating machines that are used in, for example, motor vehicles as electric motors and electric generators.

2 Description of Related Art

Conventionally, electric rotating machines, which are used in motor vehicles as electric motors and electric generators, include a rotor and a stator that is disposed in radial opposition to the rotor. The stator includes an annular (or a hollow cylindrical) stator core and a stator coil. The stator core has a plurality of slots arranged in a circumferential direction of the stator core. The stator coil is mounted on the stator core so as to be received in the slots of the stator core. Moreover, to reduce iron loss, the stator core is generally formed by laminating a plurality of steel sheets in the axial direction thereof.

Patent Document 1 (i.e., Japanese Patent Application Publication No. JP2010288424A) discloses an annular stator core which is comprised of a plurality of stator core segments that are arranged in the circumferential direction of the stator core so as to adjoin one another in the circumferential direction. Moreover, also for the purpose of reducing iron loss, each of the stator core segments is formed by laminating a plurality of steel sheets in the axial direction of the stator core.

Patent Document 2 (i.e., Japanese Patent Application Publication No. JP2011097790A) discloses a heating device that includes an induction coil for induction-heating a stator core which has a stator coil mounted thereon.

Specifically, the heating device disclosed in Patent Document 2 is designed to fix the stator coil to the stator core by heating and thereby setting (or hardening) a liquid thermosetting resin (e.g., varnish) with the heat of the stator core that is induction-heated.

More specifically, the liquid thermosetting resin is impregnated into predetermined portions of the stator coil, which are received in the slots of the stator core, and retained at the predetermined portions. Then, the induction coil of the heating device, which is placed at a predetermined position radially inside the annular stator core, is energized to induction-heat the stator core to the setting temperature of the thermosetting resin. Consequently, with increase in the temperature of the stator core, the thermosetting resin is heated and set, thereby fixing the stator coil to the stator core.

However, since the thermosetting resin is initially in the liquid state, it may be difficult to impregnate the thermosetting resin into the predetermined portions of the stator coil and retain the same at the predetermined portions. Consequently, it may be difficult to set the thermosetting resin at the predetermined portions.

SUMMARY

According to exemplary embodiments, there is provided a stator for an electric rotating machine. The stator includes an annular stator core, an outer cylinder fitted on a radially outer surface of the stator core, and a stator coil mounted on the stator core. The stator core is comprised of a plurality of stator core segments that are arranged in a circumferential direction of the stator core so as to adjoin one another in the circumferential direction. The stator coil is fixed to the stator core by a thermosetting resin that is set by induction-heating the stator core. Each of the stator core segments is formed by laminating a plurality of steel sheets in an axial direction of the stator core and fixing at least some of the steel sheets by staking. The number of staking portions formed in one of the steel sheets is different from the number of staking portions formed in another one of the steel sheets.

With the above configuration, in induction-heating the stator core for setting the thermosetting resin, it is possible to set the temperature rise gradient in the stator core segments in the axial direction of the stator core to a desired state, thereby retaining and setting the thermosetting resin at desired positions.

In one exemplary embodiment, for each of the stator core segments, the plurality of steel sheets forming the stator core segment include a plurality of first steel sheets and a plurality of second steel sheets. The number of staking portions formed in each of the first steel sheets is larger than the number of staking portions formed in each of the second steel sheets. The first steel sheets are arranged at both end parts of the stator core segment in the axial direction of the stator core, and the second steel sheets are arranged at a central part of the stator core segment in the axial direction.

In another exemplary embodiment, for each of the stator core segments, the plurality of steel sheets forming the stator core segment include a plurality of first steel sheets and a plurality of second steel sheets. The number of staking portions formed in each of the first steel sheets is larger than the number of staking portions formed in each of the second steel sheets. The first steel sheets are arranged at a central part of the stator core segment in the axial direction of the stator core, and the second steel sheets are arranged at both end parts of the stator core segment in the axial direction.

In the above exemplary embodiments, the second steel sheets may be fixed by at least one fixing means selected from staking, welding and adhesive bonding.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings.

DESCRIPTION OF EMBODIMENTS

Exemplary embodiments and their modifications will be described hereinafter with reference to FIGS. 1-13. It should be noted that for the sake of clarity and understanding, identical components having identical functions throughout the whole description have been marked, where possible, with the same reference numerals in each of the figures and that for the sake of avoiding redundancy, descriptions of the identical components will not be repeated.

First Embodiment

Figure 1:
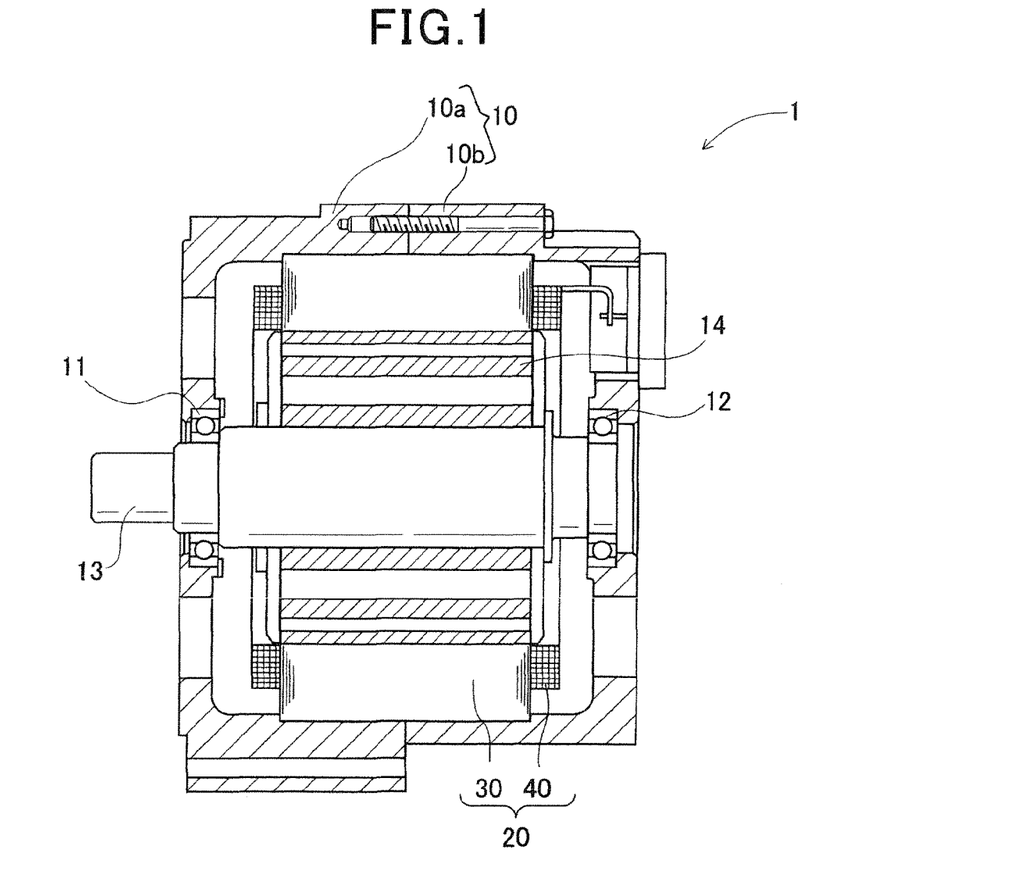
FIG. 1 is a schematic cross-sectional view of an electric rotating machine which includes a stator according to a first embodiment.

FIG. 1 shows the overall configuration of an electric rotating machine 1 which includes a stator 20 according to a first embodiment.

In the present embodiment, the electric rotating machine 1 is configured as an electric motor for use in a motor vehicle.

As shown in FIG. 1, the electric rotating machine 1 further includes a housing 10, a rotating shaft 13 and a rotor 14 in addition to the stator 20. The housing 10 is comprised of a pair of cup-shaped housing pieces 10a and 10b which are jointed together at the open ends thereof. The housing 10 has a pair of bearings 11 and 12 mounted therein, via which the rotating shaft 13 is rotatably supported by the housing 10. The rotor 14 is received in the housing 10 and coaxially fixed on the rotating shaft 13. The stator 20 is fixed in the housing 10 so as to surround the radially outer periphery of the rotor 14.

The rotor 14 includes a plurality of permanent magnets that form a plurality of magnetic poles on the radially outer periphery of the rotor 14 facing the radially inner periphery of the stator 20. The polarities of the magnetic poles alternate between north and south in the circumferential direction of the rotor 14. The number of the magnetic poles can be suitably set according to the design specification of the electric rotating machine 1. In the present embodiment, the number of the magnetic poles is set to be equal to, for example, eight (i.e., four north poles and four south poles).

Figure 2A:
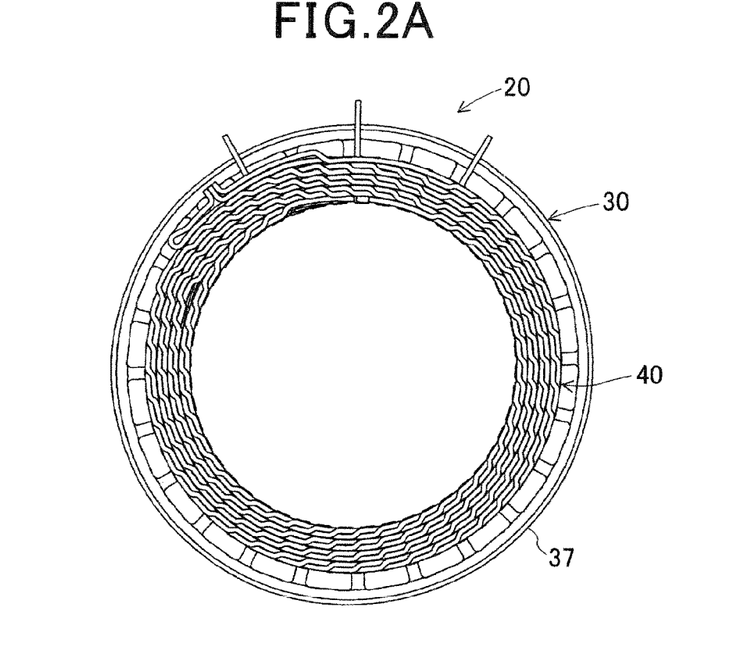
FIG. 2A is an axial end view of the stator.
Figure 2B:
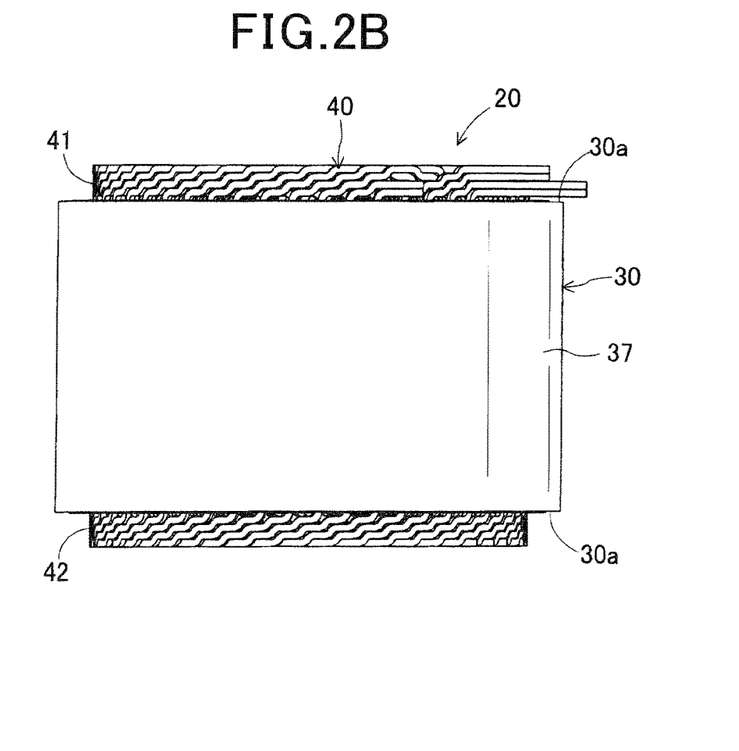
FIG. 2B is a side view of the stator.
Figure 3:
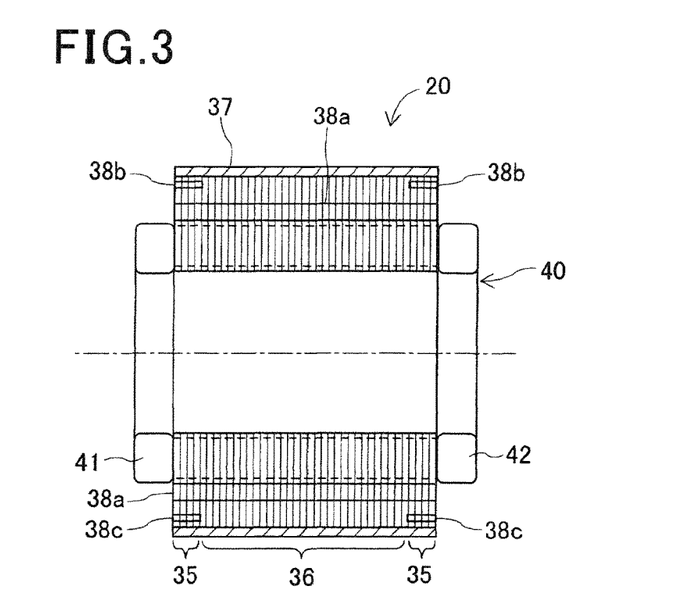
FIG. 3 is a schematic cross-sectional view of the stator.

Referring now to FIGS. 2A-2B and 3, the stator 20 includes an annular (or a hollow cylindrical) stator core 30, a three-phase stator coil 40 and an outer cylinder 37. In addition, the stator 20 may further have insulating paper interposed between the stator core 30 and the stator coil 40.

As shown in FIGS. 4-7, the stator core 30 includes an annular back core portion 33, a plurality of stator teeth 34 and a plurality of slots 31. Each of the stator teeth 34 extends from the back core portion 33 radially inward. The stator teeth 34 are equally spaced from one another in the circumferential direction of the stator core 30 at predetermined intervals. Each of the slots 31 is formed between one circumferentially-facing pair of side surfaces 34a of the stator teeth 34 so as to open on the radially inner periphery of the stator core 30. Moreover, each circumferentially-facing pair of the side surfaces 34a of the stator teeth 34, which define one of the slots 31 therebetween, extend parallel to each other. Consequently, each of the slots 31 radially extends at a constant circumferential width. In addition, for each of the slots 31, the depth direction of the slot 31 is coincident with a radial direction of the stator core 30.

In the present embodiment, the stator coil 40 is configured as a double-slot distributed winding. Accordingly, in the stator core 30, there are provided two slots 31 per magnetic pole of the rotor 14 that has the eight magnetic poles and per phase of the three-phase stator coil 40. That is, the total number of the slots 31 formed in the stator core 30 is equal to 48 (2×8×3). In addition, the total number of the stator teeth 34 formed in the stator core 30 is also equal to 48.

Figure 4:
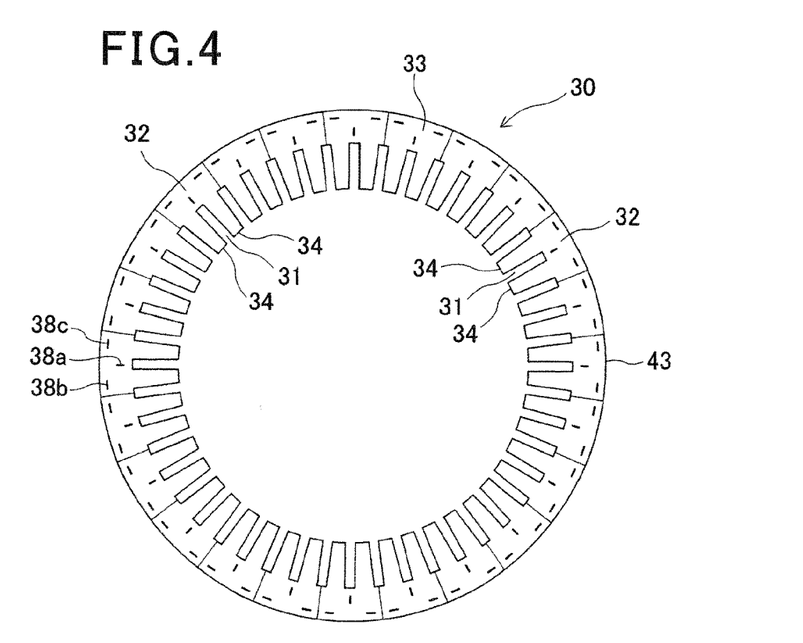
FIG. 4 is an axial end view of a stator core of the stator.

Moreover, in the present embodiment, the stator core 30 is comprised of a plurality (e.g., 24) of stator core segments 32. The stator core segments 32 are arranged in the circumferential direction of the stator core 30 so as to adjoin one another in the circumferential direction. Each of the stator core segments 32 includes two stator teeth 34 and one slot 31 formed between the two stator teeth 34. Further, each circumferentially-adjoining pair of the stator core segments 32 together form one slot 31 therebetween.

In the present embodiment, each of the stator core segments 32 is formed by laminating a plurality of magnetic steel sheets in the axial direction of the stator core 30. Each of the magnetic steel sheets is formed, by blanking with a press machine, into a predetermined shape. In addition, each of the magnetic steel sheets has a thickness of, for example, substantially 0.3 mm.

Moreover, for each of the stator core segments 32, at least some of the magnetic steel sheets forming the stator core segment 32 are fixed together by staking. The number of staking portions formed in one of the magnetic steel sheets is different from the number of staking portions formed in another one of the magnetic steel sheets.

Figure 5:
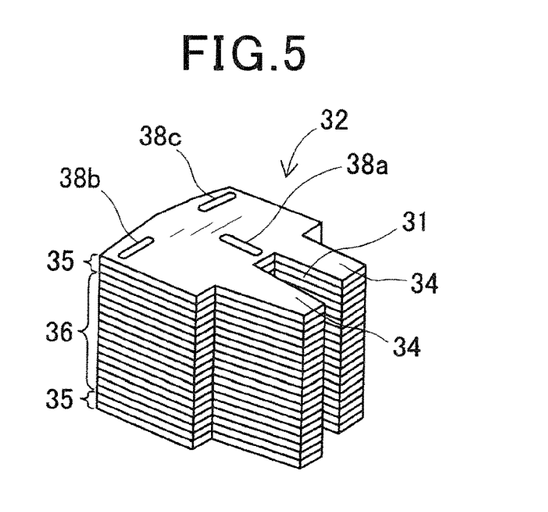
FIG. 5 is a perspective view of one of a plurality of stator core segments which together constitute the stator core.

More particularly, in the present embodiment, for each of the stator core segments 32, the magnetic steel sheets forming the stator core segment 32 include a plurality of first steel sheets 35 and a plurality of second steel sheets 36. The number of staking portions formed in each of the first steel sheets 35 is larger than the number of staking portions formed in each of the second steel sheets 36. Moreover, as shown in FIGS. 3 and 5, the first steel sheets 35 are arranged at both end parts of the stator core segment 32 in the axial direction of the stator core 30, and the second steel sheets 36 are arranged at a central part of the stator core segment 32 in the axial direction.

Figure 6:
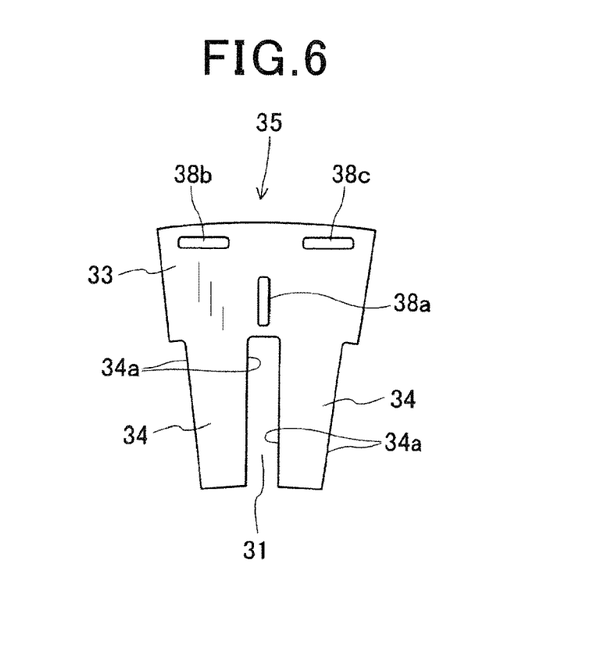
FIG. 6 is a plan view of one of a plurality of first steel sheets which are used for forming the stator core segment shown in FIG. 5.

Specifically, as shown in FIG. 6, each of the first steel sheets 35 has a first staking portion 38a, a second staking portion 38b and a third staking portion 38c that are respectively formed at three different positions in the back core portion 33. The first staking portion 38a is circumferentially centered in the first steel sheet 35 and radially extends between a radially inner end and a radial center of the back core portion 33. The second and third staking portions 38b and 38c are circumferentially positioned respectively close to opposite circumferential ends of the first steel sheet 35. Moreover, both the second and third staking portions 38b and 38c are radially positioned close to a radially outer end of the back core portion 33 and extend perpendicular to the radial direction in which the first staking portion 38a extends.

Figure 7:
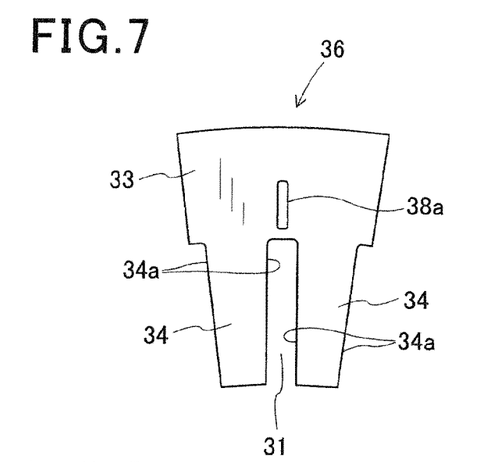
FIG. 7 is a plan view of one of a plurality of second steel sheets which are used for forming the stator core segment shown in FIG. 5.

On the other hand, as shown in FIG. 7, each of the second steel sheets 36 has only a first staking portion 38a formed in the back core portion 33. The first staking portion 38a is circumferentially centered in the second steel sheet 36 and radially extends between the radially inner end and the radial center of the back core portion 33.

That is, the first staking portions 38a of the second steel sheets 36 are formed at the same circumferential and radial positions as the first staking portions 38a of the first steel sheets 35. In other words, the first staking portions 38a of the first and second steel sheets 35 and 36 are continuously formed in the axial direction of the stator core 30.

In addition, though not shown in the figures, each of the staking portions of the first and second steel sheets 35 and 36 includes a recess formed in one of the major surfaces of the steel sheet and a protrusion formed on the other major surface. In the staking process, for each axially-adjacent pair of the first and second steel sheets 35 and 36, the protrusion (or protrusions) of the staking portion (or staking portions) of one of the steel sheets of the pair is (or are respectively) press-fitted into the recess (or recesses) of the staking portion (or staking portions) of the other steel sheet. Consequently, the first and second steel sheets 35 and 36 are fixed to one another.

The number (or the lamination thickness) of the first steel sheets 35 can be suitably set in a desired range within which it is possible to quickly set (or harden) a liquid thermosetting resin applied for fixing the stator coil 40 to the stator core 30. That is, by varying the number (or the lamination thickness) of the first steel sheets 35, it is possible to set the temperature rise gradient in the lamination direction of the steel sheets of the stator core segment 32 to a desired state.

In the present embodiment, the lamination thickness of the first steel sheets 35 at each axial end part of the stator core segment 32 is set to be substantially 10% of the thickness of the entire stator core segment 32. Accordingly, the lamination thickness of the second steel sheets 36 at the axial central part of the stator core segment 32 is set to be substantially 80% of the thickness of the entire stator core segment 32.

The outer cylinder 37 is made, for example, of a ferrous metal. As shown in FIGS. 2A-2B and 3, the outer cylinder 37 is fitted on the radially outer surfaces of the stator core segments 32 to maintain the annular shape of the stator core 30. In addition, all the radially outer surfaces of the stator core segments 32 together constitute the radially outer surface of the stator core 30.

In the present embodiment, the axial length of the outer cylinder 37 is set to be substantially equal to the axial length of the stator core 30. The outer cylinder 37 is press-fitted on the radially outer surface of the stator core 30.

Figure 8:
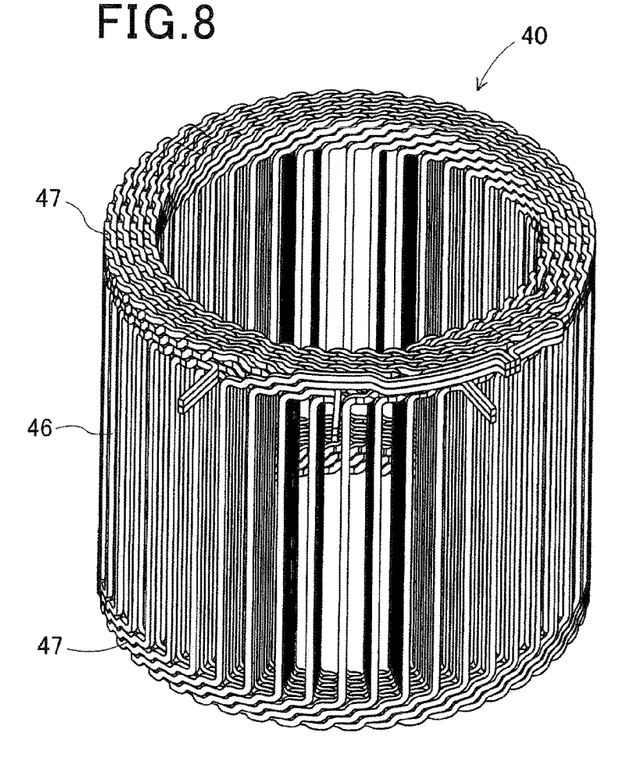
FIG. 8 is a perspective view of a stator coil of the stator.

The stator coil 40 is comprised of a plurality (e.g., 8) of wave-shaped electric wires 45. In the present embodiment, the stator coil 40 is formed by first stacking the electric wires 45 to form a flat band-shaped electric wire assembly and then spirally rolling the flat band-shaped electric wire assembly into a hollow cylindrical shape as shown in FIG. 8.

Moreover, after being mounted to the stator core 30, each of the wave-shaped electric wires 45 includes a plurality of in-slot portions 46 and a plurality of turn portions 47. Each of the in-slot portions 46 is received in a corresponding one of the slots 31 of the stator core 30. Each of the turn portions 47 is located outside the slots 31 of the stator core 30 and connects a corresponding adjacent pair of the in-slot portions 46 that are respectively received in two different ones of the slots 31 of the stator core 30.

Figure 9:
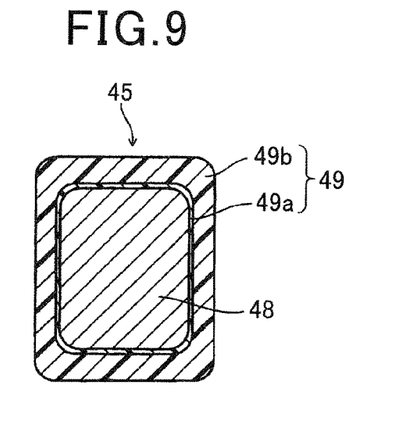
FIG. 9 is a cross-sectional view of one of a plurality of electric wires which together constitute the stator coil.

As shown in FIG. 9, in the present embodiment, each of the electric wires 45 is implemented by a rectangular wire that is configured with an electric conductor 48 and an insulating coat 49 that covers the outer surface of the electric conductor 48. The electric conductor 48 is made, for example, of copper and has a substantially rectangular cross section. The insulating coat 49 is two-layer structured to include an inner layer 49a and an outer layer 49b. The thickness of the insulating coat 49 (i.e., the sum of thicknesses of the inner and outer layers 49a and 49b) is set to be in the range of 100 nm to 200 nm.

The stator core 30 and the stator coil 40 are assembled in the following way. First, the stator teeth 34 of the stator core segments 32 are respectively inserted into the spaces formed between stacks of the in-slot portions 46 of the electric wires 45 from the radially outside of the stator coil 40; each of the stacks includes eight radially-aligned in-slot portions 46 of the electric wires 45. Consequently, the stator core segments 32 are arranged along the stator coil 40 into an annular shape. Then, the outer cylinder 37 is fitted onto the radially outer surfaces of the stator core segments 32, thereby fastening the stator core segments 32 together to form the stator core 30.

After the assembly of the stator core 30 and the stator coil 40, the in-slot portions 46 of the electric wires 45 are respectively received in the corresponding slots 31 of the stator core 30. More specifically, for each of the electric wires 45, each adjacent pair of the in-slot portions 46 are respectively received in a corresponding pair of the slots 31 which are separated from each other by a predetermined number (e.g., 3 (the number of phases)×2 (the slot multiplier number)=6 in the present embodiment) of the slots 31. Moreover, each of the turn portions 47, which connects the corresponding adjacent pair of the in-slot portions 46, protrudes from a corresponding one of axial end faces 30a of the stator core 30.

Consequently, in each of the slots 31 of the stator core 30, there are received a predetermined number (e.g., 8 in the present embodiment) of the in-slot portions 46 of the electric wires 45 so as to be radially aligned with each other. Moreover, as shown in FIGS. 2B and 3, all of those turn portions 47 of the electric wires 45 which protrude outside of the slots 31 on one axial side of the stator core 30 together make up a first annular coil end part 41 of the stator coil 40; all of those turn portions 47 of the electric wires 45 which protrude outside of the slots 31 on the other axial side of the stator core 30 together make up a second annular coil end part 42 of the stator coil 40.

Figure 10:
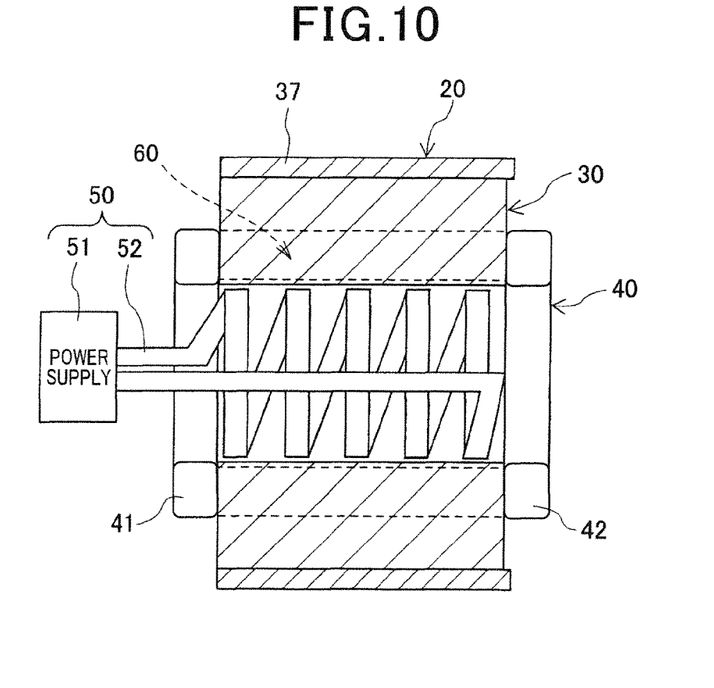
FIG. 10 is a schematic view illustrating a process of induction-heating the stator core using a heating device.

Furthermore, in the present embodiment, to secure the vibration resistance of the stator coil 40 mounted on the stator core 30, the stator coil 40 is fixed to the stator core 30 by applying a liquid thermosetting resin to the stator coil 40 and setting the thermosetting resin by induction-heating the stator core 30 using a heating device 50 as shown in FIG. 10.

More specifically, in the present embodiment, as the thermosetting resin, a liquid varnish 60 is applied to the in-slot portions 46 of the stator coil 40 received in the slots 31 of the stator core 30. The applied varnish 60 is then impregnated into voids in the slots 31 and remains in the voids and on the surfaces of the in-slot portions 46 of the stator coil 40.

The heating device 50 includes a power supply 51 and an induction coil 52. The power supply 51 is an AC power supply that is configured to supply high-frequency electric current to the induction coil 52. The induction coil 52 is formed to have a spiral shape with its outer diameter set to be smaller than the inner diameter of the annular stator core 30. The induction coil 52 is placed radially inside the stator core 30 so as to be surrounded by the stator core 30.

When the high-frequency electric current is supplied from the power supply 51 to the induction coil 52, magnetic flux will be created around the induction-coil 52, inducing eddy current in the stator core 30. Consequently, the stator core 30 will be heated by the eddy current loss occurring therein. Further, the in-slot portions 46 of the stator coil 40 will also be heated by the heat conducted from the stator core 30.

As described previously, in the present embodiment, each of the first steel sheets 35 of the stator core segments 32 has the three staking portions 38a-38c formed therein; each of the second steel sheets 36 of the stator core segments 32 has only the single staking portion 38a formed therein. Therefore, the eddy current loss occurring in the first steel sheets 35 will be higher than that occurring in the second steel sheets 36; thus, the temperature of the first steel sheets 35 will be increased more quickly than that of the second steel sheets 36. Consequently, the varnish 60 present in the vicinity of the first steel sheets 35 will be first set (or hardened) in a short time.

Further, as described previously, in the present embodiment, the first steel sheets 35 are arranged at both the axial end parts of each of the stator core segments 32 and the second steel sheets 36 are arranged at the axial central part of each of the stator core segments 32. Consequently, the varnish 60 that has not been set yet in the vicinity of the second steel sheets 36 will be trapped therein by the varnish 60 that has been quickly set in the vicinity of the first steel sheets 35. Thereafter, with further increase in the temperature of the second steel sheets 36, the varnish 60 present in the vicinity of the second steel sheets 36 will also be set.

Accordingly, in the present embodiment, it is possible to retain and set the varnish 60 at all the desired positions (or over the entire axial length of the stator core segments 32).

The above-described stator 20 according to the present embodiment has the following advantages.

In the present embodiment, the stator 20 of the electric rotating machine 1 includes the annular stator core 30, the outer cylinder 37 fitted on the radially outer surface of the stator core 30, and the stator coil 40 mounted on the stator core 30. The stator core 30 is comprised of the stator core segments 32 that are arranged in the circumferential direction of the stator core 30 so as to adjoin one another in the circumferential direction. The stator coil 40 is fixed to the stator core 30 by the varnish 60 that is set by induction-heating the stator core 30. Each of the stator core segments 32 is formed by laminating the first and second steel sheets 35 and 36 in the axial direction of the stator core 30 and fixing at least part (more particularly, all in the present embodiment) of the steel sheets 35 and 36 by staking. The number of staking portions formed in each of the first steel sheets 35 (i.e., 3) is larger than the number of staking portions formed in each of the second steel sheets 36 (i.e., 1).

With the above configuration, in induction-heating the stator core 30 for setting the liquid varnish 60 present at predetermined portions (i.e., the in-slot portions 46) of the stator coil 40, it is possible to quickly set the varnish 60 in the vicinity of the first steel sheets 35 in a short time. Consequently, it is possible to set the temperature rise gradient in the stator core segments 32 in the axial direction of the stator core 30 to a desired state, thereby retaining and setting the liquid varnish 60 at desired positions.

Moreover, in the present embodiment, for each of the stator core segments 32, the first steel sheets 35 are arranged at both the end parts of the stator core segment 32 in the axial direction of the stator core 30, and the second steel sheets 36 are arranged at the central part of the stator core segment 32 in the axial direction.

With the above arrangement, it is possible to trap, by the varnish 60 that has been quickly set in the vicinity of the first steel sheets 35, the varnish 60 that has not been set yet in the vicinity of the second steel sheets 36. Consequently, it is possible to reliably retain and set the liquid varnish 60 over the entire axial length of the stator core segments 32.

Second Embodiment

Figure 11:
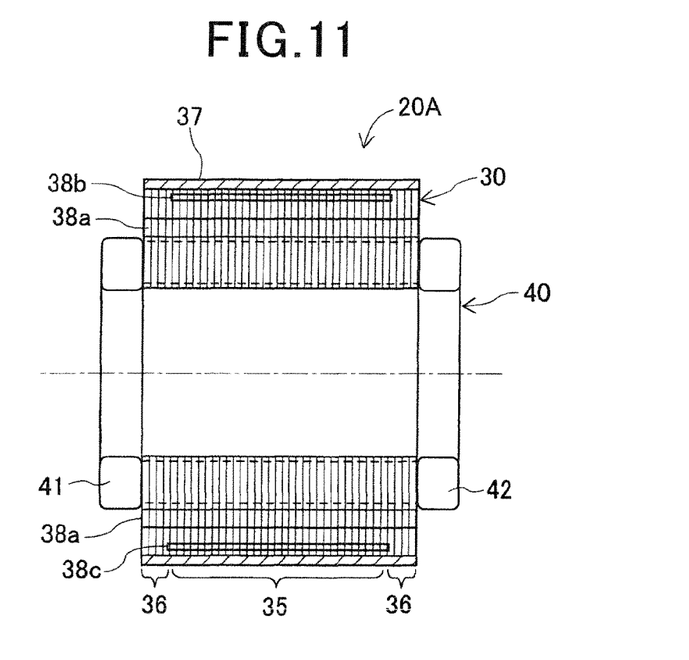
FIG. 11 is a schematic cross-sectional view of a stator according to a second embodiment.
Figure 12:
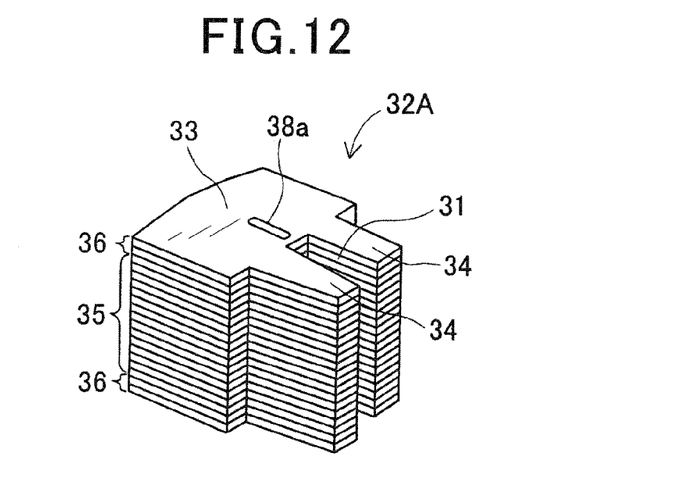
FIG. 12 is a perspective view of one of a plurality of stator core segments which together constitute a stator core of the stator according to the second embodiment.

This embodiment illustrates a stator 20A which has almost the same structure as the stator 20 according to the first embodiment. Accordingly, the differences of the stator 20A from the stator 20 will be mainly described hereinafter.

As shown in FIGS. 11-12, in the present embodiment, each of the stator core segments 32A is also formed by laminating the first and second steel sheets 35 and 36 in the axial direction of the stator core 30 and fixing all of them by staking.

However, in contrast to the first embodiment, the first steel sheets 35 are arranged at the central part of the stator core segment 32A in the axial direction of the stator core 30 (or in the lamination direction of the first and second steel sheets 35 and 36), and the second steel sheets 36 are arranged at both the end parts of the stator core segment 32A in the axial direction (or in the lamination direction).

Accordingly, in the present embodiment, the lamination thickness of the first steel sheets 35 at the axial central part of the stator core segment 32A is set to be substantially 80% of the thickness of the entire stator core segment 32A. The lamination thickness of the second steel sheets 36 at each axial end part of the stator core segment 32A is set to be substantially 10% of the thickness of the entire stator core segment 32A.

Moreover, as in the first embodiment, to secure the vibration resistance of the stator coil 40 mounted on the stator core 30, the stator coil 40 is fixed to the stator core 30 by applying the liquid varnish 60 (i.e., thermosetting resin) to the in-slot portions 46 of the stator coil 40 and setting the liquid varnish 60 by induction-heating the stator core 30 using the heating device 50 as shown in FIG. 9.

More specifically, when high-frequency electric current is supplied from the power supply 51 of the heating device 50 to the induction coil 52, the stator core 30 will be induction-heated. At this time, since the number of staking portions formed in each of the first steel sheets 35 of the stator core segments 32A is set to be larger than that formed in each of the second steel sheets 36, the temperature of the first steel sheets 35 will be increased more quickly than that of the second steel sheets 36. Moreover, as described previously, in the present embodiment, the first steel sheets 35 are arranged at the axial central part of each of the stator core segments 32A and the second steel sheets 36 are arranged at both the axial end parts of each of the stator core segments 32A. Consequently, in each of the stator core segments 32A, the varnish 60 present at the axial central part of the stator core segment 32A (or in the vicinity of the first steel sheets 35) will be first set in a short time; then, the varnish 60 present at the axial end parts of the stator core segment 32A (or in the vicinity of the second steel sheets 36) will be set later.

Accordingly, in the present embodiment, it is possible to reliably retain and set the varnish 60 at desired positions (in particular, at the axial central part of each of the stator core segments 32A).

As described above, in the stator 20A according to the present embodiment, each of the stator core segments 32A is formed by laminating the first and second steel sheets 35 and 36 in the axial direction of the stator core 30 and fixing all of them by staking. The number of staking portions formed in each of the first steel sheets 35 (i.e., 3) is larger than the number of staking portions formed in each of the second steel sheets 36 (i.e., 1).

Consequently, it is possible to set the temperature rise gradient in the stator core segments 32A in the axial direction of the stator core 30 to a desired state, thereby retaining and setting the liquid varnish 60 at desired positions.

In particular, in the stator 20A according to the present embodiment, since the first steel sheets 35 are arranged at the axial central part of each of the stator core segments 32A, it is possible to quickly set the varnish 60 present at the axial central part (or in the vicinity of the first steel sheets 35).

While the above particular embodiments have been shown and described, it will be understood by those skilled in the art that various modifications, changes and improvements may be made without departing from the spirit of the present invention.

For example, in the previous embodiments, each of the stator core segments is formed by laminating, in the axial direction of the stator core 30, two types of steel sheets having different numbers of staking portions formed therein, i.e., the first steel sheets 35 each having the three staking portions 38a-38c formed therein and the second steel sheets 36 each having only the single staking portion 38a formed therein. However, each of the stator core segments may also be formed by laminating, in the axial direction of the stator core 30, three or more types of steel sheets having different numbers of staking portions formed therein. In this case, it is possible to more reliably set the temperature rise gradient in the stator core segments in the axial direction of the stator core 30 to a desired state.

Moreover, in the previous embodiments, the outer cylinder 37 is press-fitted on the radially outer surface of the stator core 30. However, the outer cylinder 37 may also be fitted on the radially outer surface of the stator core 30 by other methods, such as shrink fitting.

Figure 13:
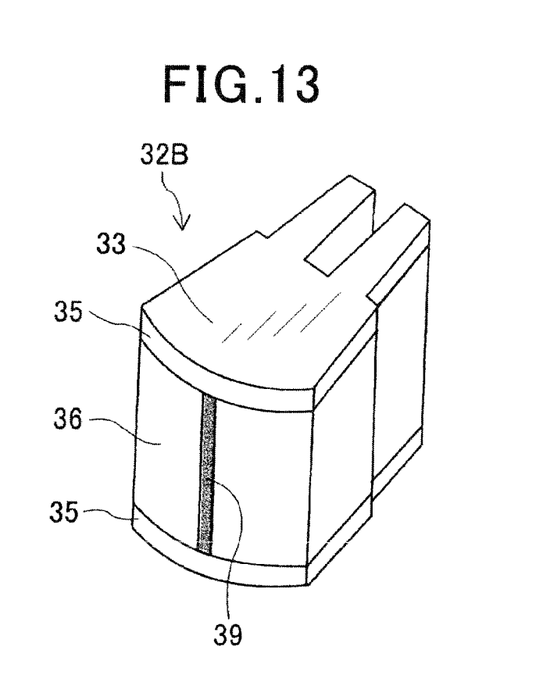
FIG. 13 is a schematic perspective view illustrating a plurality of second steel sheets fixed by welding according to one modification.

In the previous embodiments, the second steel sheets 36 are fixed by staking so that each of the second steel sheets 36 has the single staking portion 38a formed therein. However, the second steel sheets 36 may be fixed by welding, instead of staking, so as to have a weld 39 formed on the radially outer surface of the stator core segment 32B in the axial direction of the stator core 30. In this case, the number of staking portions formed in each of the second steel sheets 36 can be regarded as being equal to 0, which is smaller than the number of staking portions formed in each of the first steel sheets 35 (i.e., 3). In addition, the welding process may be performed using conventional welding methods, such as resistance welding.

Furthermore, the second steel sheets 36 may be fixed by at least one fixing means selected from staking, welding and adhesive bonding so that the number of staking portions formed in each of the second steel sheets 36 is smaller than the number of staking portions formed in each of the first steel sheets 35.

In the previous embodiments, the present invention is directed to the stators 20 and 20A for the rotating electric machine 1 which is configured as an electric motor. However, the present invention can also be applied to stators for other electric rotating machines, such as a stator for an electric generator and a stator for a motor-generator that selectively functions either as an electric motor or as an electric generator.

What is claimed is:

1. A stator for an electric rotating machine, the stator comprising:
an annular stator core comprised of a plurality of stator core segments that are arranged in a circumferential direction of the stator core so as to adjoin one another in the circumferential direction;
an outer cylinder fitted on a radially outer surface of the stator core; and
a stator coil mounted on the stator core,
wherein
the stator coil is fixed to the stator core by a thermosetting resin that is set by induction-heating the stator core,
each of the stator core segments is formed by laminating a plurality of steel sheets in an axial direction of the stator core and fixing at least some of the steel sheets by staking,
for each of the stator core segments, the plurality of steel sheets forming the stator core segment comprise a plurality of first steel sheets and a plurality of second steel sheets,
the number of staking portions formed in each of the first steel sheets is larger than the number of staking portions formed in each of the second steel sheets,
in the axial direction of the stator core, the first steel sheets are arranged in a first range where it is desired for the thermosetting resin to be more quickly set than in a second range, and the second steel sheets are arranged in the second range where it is allowed for the thermosetting resin to be set more slowly than in the first range,
the stator core has a plurality of slots formed therein;
the stator coil has a plurality of in-slot portions each of which is received in a corresponding one of the slots of the stator core;
the thermosetting resin is applied to the in-slot portions of the stator coil;
the stator core also has an annular back core portion and a plurality of stator teeth;
the stator teeth each extend from the back core portion radially inward and are spaced from one another in the circumferential direction of the stator core at predetermined intervals;
each of the slots is formed between one circumferentially-adjacent pair of the stator teeth so as to open on a radially inner periphery of the stator core; and
each of the second steel sheets has only one staking portion formed in the back core portion and circumferentially centered in the second steel sheet.

2. The stator as set forth in claim 1, wherein
the first range where the first steel sheets are arranged comprises both end parts of the stator core segment in the axial direction of the stator core, and the second range where the second steel sheets are arranged comprises a central part of the stator core segment in the axial direction.

3. The stator as set forth in claim 2, wherein the second steel sheets are fixed by at least one fixing means selected from staking, welding and adhesive bonding.

4. The stator as set forth in claim 1, wherein
the first range where the first steel sheets are arranged comprises a central part of the stator core segment in the axial direction of the stator core, and the second range where the second steel sheets are arranged comprises both end parts of the stator core segment in the axial direction.

5. The stator as set forth in claim 4, wherein the second steel sheets are fixed by at least one fixing means selected from staking, welding and adhesive bonding.

6. A stator for an electric rotating machine, the stator comprising:
an annular stator core comprised of a plurality of stator core segments that are arranged in a circumferential direction of the stator core so as to adjoin one another in the circumferential direction;
an outer cylinder fitted on a radially outer surface of the stator core; and
a stator coil mounted on the stator core,
wherein
the stator coil is fixed to the stator core by a thermosetting resin that is set by induction-heating the stator core,
each of the stator core segments is formed by laminating a plurality of steel sheets in an axial direction of the stator core and fixing at least some of the steel sheets by staking,
for each of the stator core segments, the plurality of steel sheets forming the stator core segment comprise a plurality of first steel sheets and a plurality of second steel sheets,
the number of staking portions formed in each of the first steel sheets is larger than the number of staking portions formed in each of the second steel sheets,
in the axial direction of the stator core, the first steel sheets are arranged in a first range where it is desired for the thermosetting resin to be more quickly set than in a second range, and the second steel sheets are arranged in the second range where it is allowed for the thermosetting resin to be set more slowly than in the first range,
the stator core has a plurality of slots formed therein;
the stator coil has a plurality of in-slot portions each of which is received in a corresponding one of the slots of the stator core;
the thermosetting resin is applied to the in-slot portions of the stator coil;
the stator core also has an annular back core portion and a plurality of stator teeth;
the stator teeth each extend from the back core portion radially inward and are spaced from one another in the circumferential direction of the stator core at predetermined intervals;
each of the slots is formed between one circumferentially-adjacent pair of the stator teeth so as to open on a radially inner periphery of the stator core; and
all of the staking portions of the first and second staking portions are formed in the back core portion.

7. The stator as set forth in claim 6, wherein
the first range where the first steel sheets are arranged comprises both end parts of the stator core segment in the axial direction of the stator core, and the second range where the second steel sheets are arranged comprises a central part of the stator core segment in the axial direction.

8. The stator as set forth in claim 6, wherein
the second steel sheets are fixed by at least one fixing means selected from staking, welding and adhesive bonding.

9. The stator as set forth in claim 6, wherein
the first range where the first steel sheets are arranged comprises a central part of the stator core segment in the axial direction of the stator core, and the second range where the second steel sheets are arranged comprises both end parts of the stator core segment in the axial direction.

10. The stator as set forth in claim 6, wherein
the second steel sheets are fixed by at least one fixing means selected from staking, welding and adhesive bonding.

11. The stator as set forth in claim 6, wherein
each of the second steel sheets has only one staking portion formed in the back core portion and circumferentially centered in the second steel sheet; and
each of the first steel sheets has a first staking portion, a second staking portion and a third staking portion that are respectively formed at three different positions in the back core portion, the first staking portion being circumferentially centered in the first steel sheet and radially extending between a radially inner end and a radial center of the back core portion, the second and third staking portions being located respectively on opposite circumferential sides of the first staking portion and both radially outward of the first staking portion, each of the second and third staking portions extending perpendicular to the radial direction in which the first staking portion extends.

* * * * *